US009153036B2

(12) United States Patent
Bosco et al.

(10) Patent No.: US 9,153,036 B2
(45) Date of Patent: Oct. 6, 2015

(54) TEXTURE DETECTION IN IMAGE PROCESSING

(75) Inventors: Angelo Bosco, Giarre (IT); Arcangelo Ranieri Bruna, San Pietro Clarenza (IT); Davide Giacalone, Gela (IT); Rosetta Rizzo, Misterbianco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 154 days.

(21) Appl. No.: 13/359,333

(22) Filed: Jan. 26, 2012

(65) Prior Publication Data
US 2012/0188418 A1    Jul. 26, 2012

(30) Foreign Application Priority Data

Jan. 26, 2011  (IT) .................. VI2011A0009

(51) Int. Cl.
*H04N 5/217*   (2011.01)
*H04N 5/228*   (2006.01)
*H04N 17/00*   (2006.01)
*H04N 5/208*   (2006.01)
*G06T 7/40*    (2006.01)

(52) U.S. Cl.
CPC ....... *G06T 7/403* (2013.01); *G06T 2207/10024* (2013.01)

(58) Field of Classification Search
CPC ..... H04N 9/045; H04N 9/07; H04N 5/23212; H04N 17/00; H04N 17/004; H04N 5/361; H04N 5/365

USPC .......... 348/222.1, 241, 252, 180, 187, 188; 382/300

See application file for complete search history.

(56) References Cited

U.S. PATENT DOCUMENTS

| | | | |
|---|---|---|---|
| 7,369,165 B2 * | 5/2008 | Bosco et al. ............ | 348/272 |
| 2002/0172420 A1 * | 11/2002 | Nicolas .................. | 382/170 |
| 2003/0048368 A1 * | 3/2003 | Bosco et al. ............ | 348/272 |
| 2004/0081366 A1 * | 4/2004 | Monobe et al. .......... | 382/261 |
| 2004/0126033 A1 * | 7/2004 | Ishizaka ................. | 382/254 |
| 2005/0002570 A1 * | 1/2005 | Clark et al. ............. | 382/199 |
| 2005/0093982 A1 * | 5/2005 | Kuroki ................... | 348/207.99 |
| 2005/0276510 A1 * | 12/2005 | Bosco et al. ............ | 382/275 |
| 2007/0109430 A1 | 5/2007 | Staelin et al. | |
| 2008/0085060 A1 | 4/2008 | Bosco et al. | |
| 2009/0257672 A1 * | 10/2009 | Sullender .............. | 382/260 |
| 2010/0189374 A1 * | 7/2010 | Tsukioka .............. | 382/266 |
| 2012/0188373 A1 * | 7/2012 | Kwon et al. ........... | 348/148 |

OTHER PUBLICATIONS

Search Report based on Italian Application Serial No. VI20110009, Ministero dello Sviluppo Economico, Sep. 7, 2011, pp. 2.

(Continued)

*Primary Examiner* — Sinh Tran
*Assistant Examiner* — Xi Wang
(74) *Attorney, Agent, or Firm* — Seed IP Law Group PLLC

(57) ABSTRACT

An embodiment relates to a method for the detection of texture of a digital image, including providing a raw data image of the image by means of Bayer image sensors, determining noise in at least a region of the raw data image and determining the texture based on the determined noise without using a high pass or low pass filter.

36 Claims, 6 Drawing Sheets

(56) References Cited

OTHER PUBLICATIONS

Angelo Bosco, Sebastiano Battiato, Arcangelo Bruna, and Rosetta Rizzo, "Texture Sensitive Denoising for Single Sensor Color Imaging Devices", Computational Color Imaging, Springer Berlin Heidelberg, Berlin, Heidelberg, vol. 5646, Mar. 6, 2009, XP019125010, 10 pages.

Angelo Bosco, Massimo Mancuso, Sebastiano Battiato and Giuseppe Spampinato "Adaptive Temporal Filtering for CFA Video Sequences", ACIVS' 2002: Advanced Concepts for Intelligent Vision Systems Univ. Gent, Gent, Belgium, 2002, pp. 19-24, XP008038518, 6 pages.

Mirko Guarnera, Giuseppe Messina, Valeria Tomaselli, "Adaptive Color Demosaicing and False Color Removal", Journal of Electronic Imaging, vol. 19, No. 2, May 26, 2010, XP040514303, 16 pages.

Angelo Bosco and Massimo Mancuso, "Adaptive Filtering for Image Denoising", IEEE Proceedings of ICCE2001, ICCE. International Conference on Consumer Electronics, Los Angeles, pp. 208-209, 2 pages.

\* cited by examiner

FIG. 2

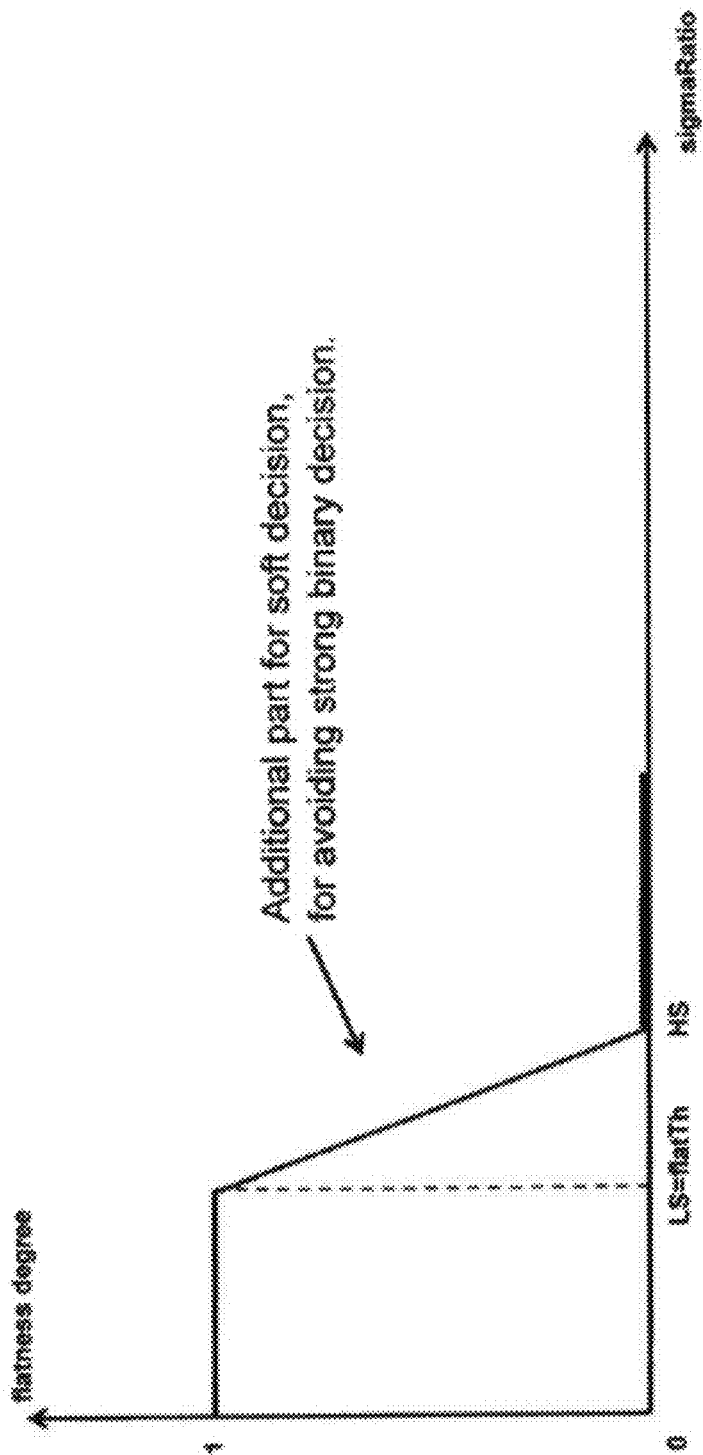

TEXTURE DETECTION IN IMAGE PROCESSING

PRIORITY CLAIM

The instant application claims priority to Italian Patent Application No. VI2011A000009, filed Jan. 26, 2011, which application is incorporated herein by reference in its entirety.

TECHNICAL FIELD

An embodiment relates to the field of image processing and, in particular, the detection of the texture of a digital image.

BACKGROUND

The image texture can be regarded as a set of metrics quantifying the arrangement of pixel intensities in a digital image or a selected region of an image. Texture detection is an important issue in image processing. For example, digital images, still pictures as well as videos, exhibit some noise that has to be reduced by appropriately designed algorithms. The noise filtering, however, has to be adjusted according to the detected texture in order to avoid blurring of the image. If a selected region of an image is homogenous (flat), it can be heavily filtered since pixel variations are basically caused by noise. If, on the other hand, the selected region of an image is highly textured, pixel variations are mainly caused by the texture, and filtering should be performed lightly and with caution. Basically, only small differences from pixel-to-pixel shall be noise filtered.

In the art, texture detection is performed in the luminance domain and is based on high pass/low pass filtering. Conventional methods of texture detection are known as Sobel, Prewitt, or Canny maps. For example, the texture can be obtained from the Spatial Noise Level and the maximum of the absolute differences between a particular current pixel and its neighbors (see, for example, A. Bosco and M. Mancuso, "Adaptive Filtering for Image Denoising", in IEEE Proceedings of ICCE2001, pages 208-209, 2001, which is incorporated by reference). However, despite the recent engineering progress, texture detection and noise reduction based on the same still are not sufficiently reliable and satisfying, in particular, in noisy images. The conventional methods not only are sensitive to noise, but also need appropriate fine tuning of thresholds in order to avoid a misclassification of pixels.

SUMMARY

An embodiment is a new approach for texture detection that proves robust for noisy images.

An embodiment addresses the above-mentioned problem and, accordingly, is a method for the detection of texture of a digital image, including the steps of
  receiving (providing) image data (for example, a raw CFA data) of the image from Bayer (matrixed) image sensors;
  determining noise in the image data (in least a region of the image); and
  determining the texture based on the determined noise, in particular, without using a high pass filter or a low pass filter.

Bayer matrixed image sensors are gray scale sensors covered by a Color Filter Array (CFA) providing color sensitivity. Each cell of the sensor array providing the image is sensitive to one color only (red, green or blue in RGB applications or cyan, magenta or yellow in CMY applications) and the final colored image is obtained by means of a color reconstruction algorithm (demosaicing) that combines the color information of neighboring pixels. According to an embodiment, texture is determined from the noise present in the thus obtained raw CFA data. According to an embodiment the texture of an image is determined based on noise without high or low pass filtering and, therefore, the provided method for texture detection is robust against high noise levels.

According to an embodiment, the above-described method further includes the steps
  providing a first sub-mask (layer) centered on a center pixel and containing Bayer samples (i.e. real Bayer pixel values);
  interpolating over the pixel locations of the Bayer samples to obtain three interpolated sub-masks (layers); and
  determining a texture measure for each of the first sub-mask and the three interpolated sub-masks; and wherein
  the texture is determined from the determined texture measures of the sub-masks.

Note that, herein, the terms "texture measure" and "flatness measure" are used complementary to each other. A maximum texture measure implies a minimum flatness measure and vice versa. The mentioned sub-masks constitute a moving kernel scanning over the raw data image. For instance, a 9×9 (pixel) sized kernel including 3×3 sub-masks may be employed. At each scanning step the texture degree of the central pixel is determined and then the kernel is moved, for example, pixel-wise. The first sub-mask centered on the central pixel contains real sensed Bayer samples, i.e., information on the intensity of Red, GreenRed, GreenBlue or Blue, for example. In principle, texture detection could be done based on these real values for a particular CFA channel only. However, in order to increase precision of the texture detection, especially along tiny edges, the information from the other CFA channels is also taken into account. Therefore, the other CFA channels pixels adjacent to the first sub-mask containing the real sensed Bayer GreenRed samples are considered. According to an embodiment, the respective missing Bayer information at each pixel location where real sensed Bayer samples exist is interpolated. This procedure results in very reliable texture detection even in relatively high noise portions of the digital image under consideration.

According to an embodiment, for each of the first sub-mask and the three interpolated sub-masks determining the respective texture measure includes:
  determining the standard deviation of the pixel values of the pixels in the sub-mask;
  determining the minimum pixel value of the pixels surrounding the central pixel; and
  determining the noise level associated with the minimum pixel value.

The noise level can be determined from Look-Up Tables that are generated before-hand as it is described in the detailed description below. This particular manner of determining the texture measure of a sub-mask is successful with respect to the detection of tiny structures even in noisy parts of the digital picture.

In particular, the texture may be determined from the ratio of the standard deviation of the pixel values (sigmaMask) and the noise level associated with the minimum pixel value (sigmaSensor). In the following, this ratio that is determined for each of the sub-masks is denoted by the term sigmaRatio, i.e., sigmaRatio=sigmaMask/sigmaSensor. For flat regions (texture-free) of the image sigmaRatio is close to 1 and sigmaRatio increases with increasing texture.

A total texture measure may be determined from the sum of the sigmaRatio values obtained for the first sub-mask and the three interpolated sub-masks. If desired, a weighted sum weighting the different CFA channels differently may be computed. According to an example, a texture degree can be assigned to a pixel (the central pixel mentioned above) and a region of the image based on the sum of the sigmaRatio values (i.e. the total texture measure) and a region (including pixels that are central pixels of the kernel in a scanning step) of the image can be classified as a textured region or a flat region, respectively, based on that total texture measure.

The classification in textured and flat central pixels and, thereby, in textured and flat regions, respectively, may be performed based on some texture threshold. In principle, if sigmaRatio, as the texture measure, exceeds the threshold, the respective central pixel is considered textured, and it is considered flat if the threshold is not exceeded (however, some smoother decision may be preferred, see below). The texture can be determined based on sigmaRatio values obtained for flat patches of a Macbeth chart, for example. The determination of the threshold may represent a crucial issue and employment of the Macbeth chart can give satisfying classification results. However, other manners of determining the texture threshold are possible.

The results of the above-described examples of an embodiment herein disclosed for texture detection can be even further improved by considering the following. Depending on the size of the kernel (sub-mask), e.g., sub-masks consisting of 3×3 pixels, the range of oscillations of pixel values can be lower than actual oscillations over a larger region of the image. The relative small number of samples might not be sufficiently representative for the full range of oscillations that are present in a larger kernel positioned over the same area. Therefore, some underestimation of the texture may result due to the finite size of the sub-masks. In view of this, according to an example, an embodiment includes correcting (adjusting) the texture threshold for compensation of an underestimating of the texture due to incomplete coverage of oscillations of pixel values resulting from finite-size sub-masks.

Furthermore, one may take into account some compensation for the fact that the interpolated sub-masks (layers) show relatively low standard deviations as compared to the real channel sub-masks. Thus, the texture threshold can be lowered for the interpolated sub-masks, and according to an example, an embodiment for texture detection further includes correcting (adjusting) the texture threshold for compensation of an underestimating of the texture due to the interpolation process by which the three interpolated sub-masks are obtained.

Moreover, it should be noted that classification in textured and flat regions can be done in a soft manner in order to avoid some binary decision between textured and flat (see detailed description below). Both the underestimation of the texture that may result due to the finite size of the sub-masks and the fact that the interpolated sub-masks show relatively low standard deviations can be taken into account when selecting the texture threshold. Further, for reasons of speeding up the computational process, a linear smooth transition between 100% flatness and 0% flatness can be implemented. In this case, a first lower and a second higher threshold can be selected such that if sigmaRatio is below the first threshold, 100% flatness is assigned to the central pixel of the kernel under consideration, if sigmaRatio is greater than the second threshold, 0% flatness is assigned to the central pixel of the kernel under consideration, and if sigmaRatio is between the first and the second thresholds a flatness degree corresponding to a linear function between 100% and 0% flatness is assigned to the central pixel.

The above-described examples of a method for texture detection can be used for texture segmentation and texture synthesis. A goal of texture segmentation is to obtain the boundary map separating the differently textured regions in an image. They also find application in the context of noise reduction in digital images. Thus, it is also provided an embodiment for reducing noise of a digital image, including a method for the detection of texture of the digital image according to one of the preceding examples and further including noise filtering of the digital image by means of a filter, in particular, a Gaussian filter, wherein the filter coefficients of the filter are adapted based on the detected texture. In particular, the filter coefficients may be damped by damping coefficients obtained from the detected texture, in particular, the determined texture degree.

In order to address the above-mentioned problem, an embodiment of an imaging device includes Bayer matrixed image sensors configured to obtain an image data (for example, a CFA raw data image) and a processing unit including a texture detection unit configured to determine noise in the image data (in at least a region of the image) and to determine the texture based on the determined noise without using a high pass or low pass filter. The imaging device may be a photo camera, a video camera, a mobile phone or a PDA, for example. The processing unit can be configured to perform some or all of the steps described in the above examples of a method for texture detection or noise reduction. In particular, the kernel including the real value sub-masks and the three interpolation masks may be implemented. Moreover, the imaging device may further include a noise reduction unit configured to reduce noise in the digital image.

BRIEF DESCRIPTION OF THE DRAWINGS

Features and advantages of one or more embodiments will be described with reference to the drawings. In the description, reference is made to the accompanying figures that are meant to illustrate one or more embodiments. It is understood that such embodiments are not intended to be limiting.

FIG. 2 illustrates an example of the interpolation process used for texture detection based on the 9×9 processing kernel shown in FIG. 1.

FIG. 6 illustrates the flatness degree as a function of sigmaRatio according to a linear interpolation implementation according to an example.

DETAILED DESCRIPTION

Figure 1:
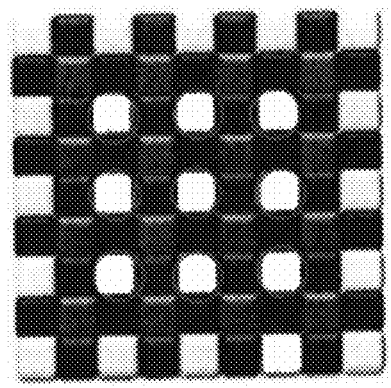
FIG. 1 illustrates a 9×9 processing kernel including a 3×3 sub-mask containing real Bayer samples and three 3×3 interpolated sub-masks used according to an example of a method for texture detection.

As it is shown in FIG. 1, according to an embodiment, a processing kernel having a size of 9×9 pixels is employed for analyzing a CFA raw data image. It is to be understood that an embodiment is not restricted to a size of 9×9 pixels and, particularly, a larger size can be chosen. In the CFA image each pixel location is sensitive to one color component, which is achieved by providing the appropriate filter for each of the pixels. Besides Red, Green, and Blue there are GreenRed representing a Green pixel in a row of Red pixels and GreenBlue representing a green pixel in a row of Blue pixels. An input CFA image is scanned pixel-wise by the moving processing kernel. For each position of the moving kernel (mask) a texture measure or a flatness measure and a texture or flatness degree are assigned to the central pixel. The mask is centered on that central pixel that can be a Red, GreenRed, GreenBlue, or Blue one. Note, that the degree of texture and the degree of flatness that are complementary to each other and can be alternatively measured and used in an embodiment. In fact, if no flatness is defined by a value of zero and 1 denotes maximum flatness, the degree of texture is given be 1 minus the degree of flatness.

Once a texture/flatness degree is assigned to the central pixel, the mask moves to the next adjacent pixel or, alternatively, is moved by more than one pixel depending on the concrete realization. A 3×3 sub-mask centered on the central pixel contains real Bayer samples sensed by photodiodes covered by receptive color filters. Three other 3×3 sub-masks are obtained by interpolation over the same grid-locations where the real samples are available. An example for the interpolation is given in the following. Suppose at a particular time the moving kernel is centered on a GreenRed pixel, for example (see FIG. 1), i.e., the central pixel is a GreenRed one. A 3×3 sub-mask centered on the central pixel contains real sensed Bayer GreenRed samples indicated by the circles. However, in order to increase precision of the texture detection, especially along tiny edges with a width of about 1 pixel, the information from the other CFA channels, Red, Blue and GreenBlue, in the present example, is also taken into account. In order to exploit the information from the other CFA channels, pixels adjacent to the 3×3 sub-mask containing the real sensed Bayer GreenRed samples have to be considered.

According to an example, the respective missing Bayer information at each pixel location where real sensed Bayer samples exist is interpolated. This means that the missing Bayer information (Red, Blue and GreenBlue) is interpolated at the pixels of real sensed Bayer GreenRed indicated by the circles in FIG. 1. This interpolation mitigates the problem of sample mismatch in the Bayer grid and, in particular, allows for a better detection of tiny lines of widths of about a pixel.

Figure 2:
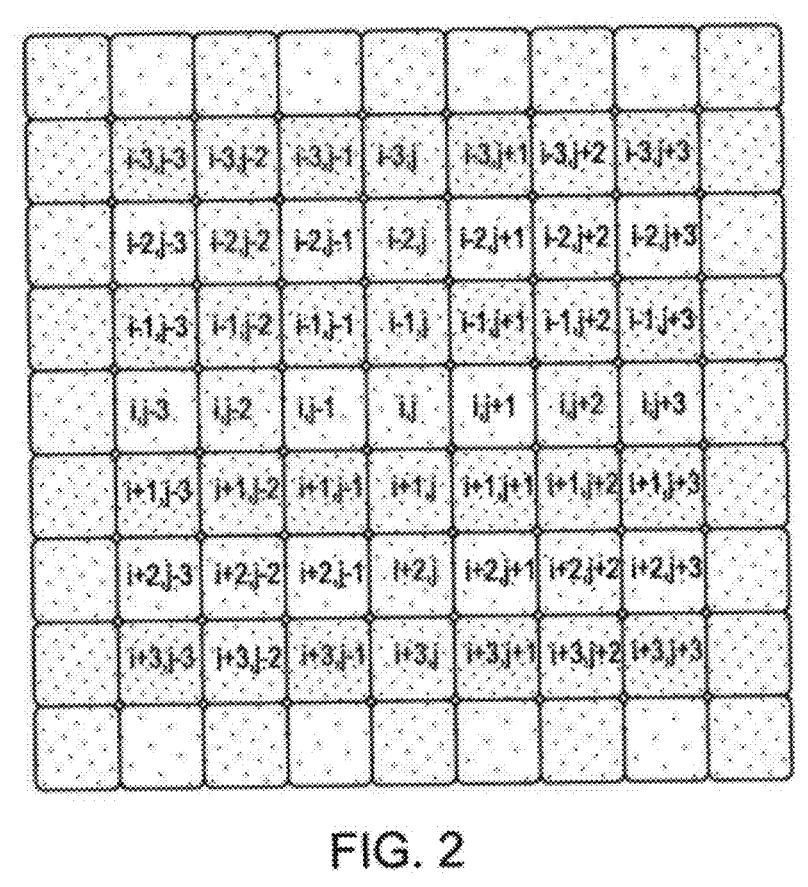

The interpolation process in detail reads as follows. Assume that (i, j) are the generic coordinates of the central GreenRed pixel shown in FIG. 1. The pixel left of the central pixel has the coordinates i, j−1, the pixel right of the central pixel has the coordinates i, j+1, the pixel atop of the central pixel has the coordinates i−1, j, and the pixel below the central pixel has the coordinates i+1, j, etc. The 3×3 sub-mask (also named "layer") containing the real sensed Bayer GreenRed samples denoted by layer1 is given by (see FIG. 2):

$$layer1(0,0)=CFA(i-2,j-2),$$

$$layer1(0,1)=CFA(i-2,j),$$

$$layer1(0,2)=CFA(i-2,j+2),$$

$$layer1(1,0)=CFA(i,j-2),$$

$$layer1(1,1)=CFA(i,j),$$

$$layer1(1,2)=CFA(i,j+2),$$

$$layer1(2,0)=CFA(i+2,j-2),$$

$$layer1(2,1)=CFA(i+2,j),$$

$$layer1(2,2)=CFA(i+2,j+2).$$

In addition, three interpolation sub-masks (layers) are to be generated. For the Red channel, Red pixels are interpolated as the mean of the left and right pixels adjacent to the real sensed pixels to obtain the Red 3×3 interpolated sub-mask layer2:

$$layer2(0,0)=[CFA(i-2,j-3)+CFA(i-2,j-1)]/2,$$

$$layer2(0,1)=[CFA(i-2,j-1)+CFA(i-2,j+1)]/2,$$

$$layer2(0,2)=[CFA(i-2,j+1)+CFA(i-2,j+3)]/2,$$

$$layer2(1,0)=[CFA(i,j-3)+CFA(i,j-1)]/2,$$

$$layer2(1,1)=[CFA(i,j-1)+CFA(i,j+1)]/2,$$

$$layer2(1,2)=[CFA(i,j+1)+CFA(i,j+3)]/2,$$

$$layer2(2,0)=[CFA(i+2,j-3)+CFA(i+2,j-1)]/2,$$

$$layer2(2,1)=[CFA(i+2,j-1)+CFA(i+2,j+1)]/2,$$

$$layer2(2,2)=[CFA(i+2,j+1)+CFA(i+2,j+3)]/2.$$

The Blue channel pixels are interpolated as the mean of the upper and lower pixels adjacent to the real sensed pixels to obtain the Blue 3×3 interpolated sub-mask layer3:

$$layer3(0,0)=[CFA(i-3,j-2)+CFA(i-1,j-2)]/2,$$

$$layer3(0,1)=[CFA(i-3,j)+CFA(i-1,j)]/2,$$

$$layer3(0,2)=[CFA(i-3,j+2)+CFA(i-1,j+2)]/2,$$

$$layer3(1,0)=[CFA(i-1,j-2)+CFA(i+1,j-2)]/2,$$

$$layer3(1,1)=[CFA(i-1,j)+CFA(i+1,j)]/2,$$

$$layer3(1,2)=[CFA(i-1,j+2)+CFA(i+1,j+2)]/2,$$

$$layer3(2,0)=[CFA(i+1,j-2)+CFA(i+3,j-2)]/2,$$

$$layer3(2,1)=[CFA(i+1,j)+CFA(i+3,j)]/2,$$

$$layer3(2,2)=[CFA(i+1,j+2)+CFA(i+3,j+2)]/2.$$

The GreenBlue channel pixels are interpolated as the mean of the four corner pixels adjacent to the real sensed pixels to obtain the GreenBlue 3×3 interpolated sub-mask layer4:

$$layer4(0,0)=[CFA(i-3,j-3)+CFA(i-3,j-1)+CFA(i-1,j-3)+CFA(i-1,j-1)]/4,$$

$$layer4(0,1)=[CFA(i-3,j-1)+CFA(i-3,j+1)+CFA(i-1,j-1)+CFA(i-1,j+1)]/4,$$

$$layer4(0,2)=[CFA(i-3,j+1)+CFA(i-3,j+3)+CFA(i-1,j+1)+CFA(i-1,j+3)]/4,$$

$$layer4(1,0)=[CFA(i-1,j-3)+CFA(i-1,j-1)+CFA(i+1,j-3)+CFA(i+1,j-1)]/4,$$

$$layer4(1,1)=[CFA(i-1,j-1)+CFA(i-1,j+1)+CFA(i+1,j-1)+CFA(i+1,j+1)]/4,$$

$$layer4(1,2)=[CFA(i-1,j+1)+CFA(i-1,j+3)+CFA(i+1,j+1)+CFA(i+1,j+3)]/4,$$

$$layer4(2,0)=[CFA(i+1,j-3)+CFA(i+1,j-1)+CFA(i+3,j-3)+CFA(i+3,j-1)]/4,$$

$$layer4(2,1)=[CFA(i+1,j-1)+CFA(i+1,j+1)+CFA(i+3,j-1)+CFA(i+3,j+1)]/4,$$

$$layer4(2,2)=[CFA(i+1,j+1)+CFA(i+1,j+3)+CFA(i+3,j+1)+CFA(i+3,j+3)]/4.$$

Figure 3:
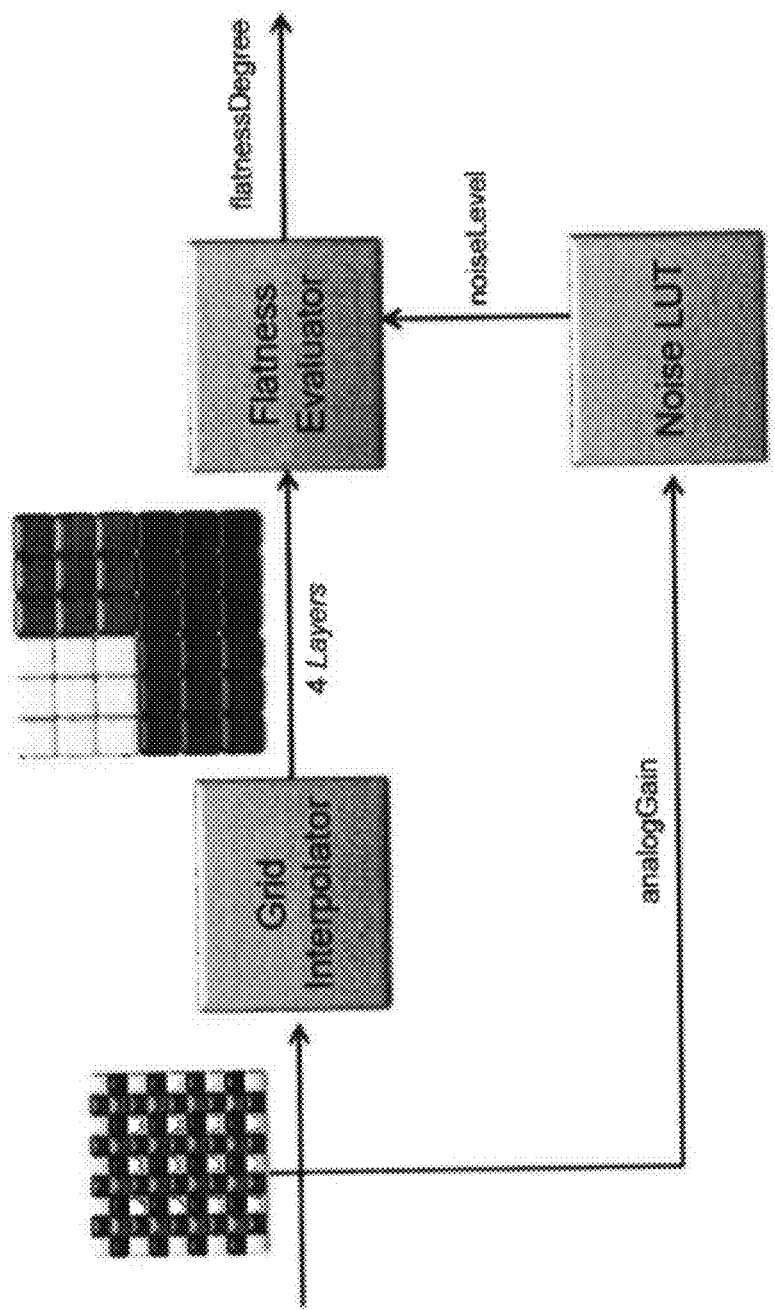
FIG. 3 illustrates basic units of an image processing means according to an example.

Thus, after completion of the interpolation process, in total four sub-masks (layers), namely, layer1, layer2, layer3 and layer4, are available. If the 3×3 sub-mask containing the real sensed Bayer samples contains Red, Blue, or GreenBlue samples, layer1 to layer4 are generated accordingly. If the central pixel of the 9×9 kernel shown in FIG. 1 is, for example, a GreenRed one, layer1 refers to GreenRed, layer2 refers to Red, layer3 refers to Blue, and layer4 refers to GreenBlue, etc. FIG. 3 represents a principle block diagram including a grid interpolator unit, a noise LUT unit, and a flatness evaluator (texture evaluator) unit. From raw Bayer data, the grid interpolator unit outputs the four layers (sub-masks) illustrated in FIGS. 1 and 2. In an embodiment, the analog gain is determined from the kernel. In another embodiment, the analog gain is an acquisition factor and it is set by the camera when deciding the exposure (if the exposure is automatic). The analog gain is the same for the entire picture. Basically it is equivalent to the ISO setting. So, to be more precise, this gain is already known from the image acquisition settings and it is not inferred from the data in the kernel.

Based on look-up tables, the noise level is determined in the noise LUT unit. The information on the noise level is based on noise curves that are available before-hand (see below) and is input to the flatness evaluator unit that determines the flatness degree (or texture degree respectively).

In some detail, as the 9×9 CFA kernel shown on FIG. 1 moves, for example pixel-wise, across the CFA image, for each of the four 3×3 sub-masks illustrated in FIG. 1 the following procedure is carried out:

1) The standard deviation (sigmaMask) of the 9 pixel values in the sub-mask (layer) is computed.

2) The minimum value (RingMin) of the pixel values in the ring of the layer is computed. By the term "ring", the set of the 8 pixels surrounding the central pixel of the sub-mask is denoted. Although one may use the ring minimum, in another embodiment one may use the maximum or the average of the ring pixels for example; using the minimum allows potentially misclassifying pixels as texture rather than flatness. For example, if we divide by ringMax, then the sigmaRatio values become lower (because the denominator is higher). Basically, dividing by a number greater than ringMin has the effect of decreasing the sensitivity to texture in favor of flatness. Therefore, although using the minimum ring value may be preferred in some applications, using the minimum ring value is not a requirement.

3) The value sigmaSensor referring to the noise level associated with the minimum value RingMin of the ring sigmaSensor=sigma (RingMin, AG), where AG denotes the analog gain at which the image under consideration is obtained. The analog gain is needed, since for any given pixel value its noise level Sigma (standard deviation of the noise) changes depending on the employed analog gain (see also FIG. 4). For the same pixel intensity value, the higher the analog gain is selected, the higher the noise level is. The noise level values (Sigma values) associated with the pixel intensity values are typically stored in Look-Up Tables that are generated before-hand during image sensor noise profiling. Hence, sigmaSensor can be obtained by accessing the Look-Up Tables, i.e., sigmaSensor=LUT [RingMin] in symbolic notation. Alternative ways for obtaining the noise level associated with the minimum value RingMin of the ring, for example, based on a fitting equation obtained for noise curves, as the noise curves shown in FIG. 4 obtained during image sensor noise profiling, might be employed. However, the sigmaSensor value is somehow provided by standard tests in a controlled environment by varying the illumination intensity, analog gains, etc., in a conventional manner.

4) The ratio of the standard deviation of the pixel values (sigmaMask) and sigmaSensor is calculated sigmaRatio=sigmaMask/sigmaSensor. SigmaRatio represents a measure for the texture/flatness of a pixel and thereby the texture/flatness degree of an area of the CFA image under consideration. This can be seen as follows. If the image area is flat (no or almost no texture), division of the standard deviation of the pixels in the sub-mask (layer) by the minimum ring noise standard deviation ideally provides a value very close to 1. If there is some texture, for example, in form of an edge, the standard deviation of the pixels in the sub-mask should overpower the standard deviation of the noise in a flat area. Some reference noise level can be given by the noise level associated with a flat area with a value equal to the minimum pixel value in the ring.

The contribution of each of the four sub-masks to the texture/flatness degree is summed to obtain a texture measure between 0 (maximum texture) and 4 (maximum flatness). But a weighted summation of the individual contributions of the four sub-masks may also be implemented according to the application. Since all four sub-masks contribute to the obtained flatness measure and degree, a problem may be mitigated that, in principle, might arise when two different image areas show substantially the same standard deviation but the arrangement of the pixel values in one of the areas contains some structure whereas the other does not.

Figure 4:
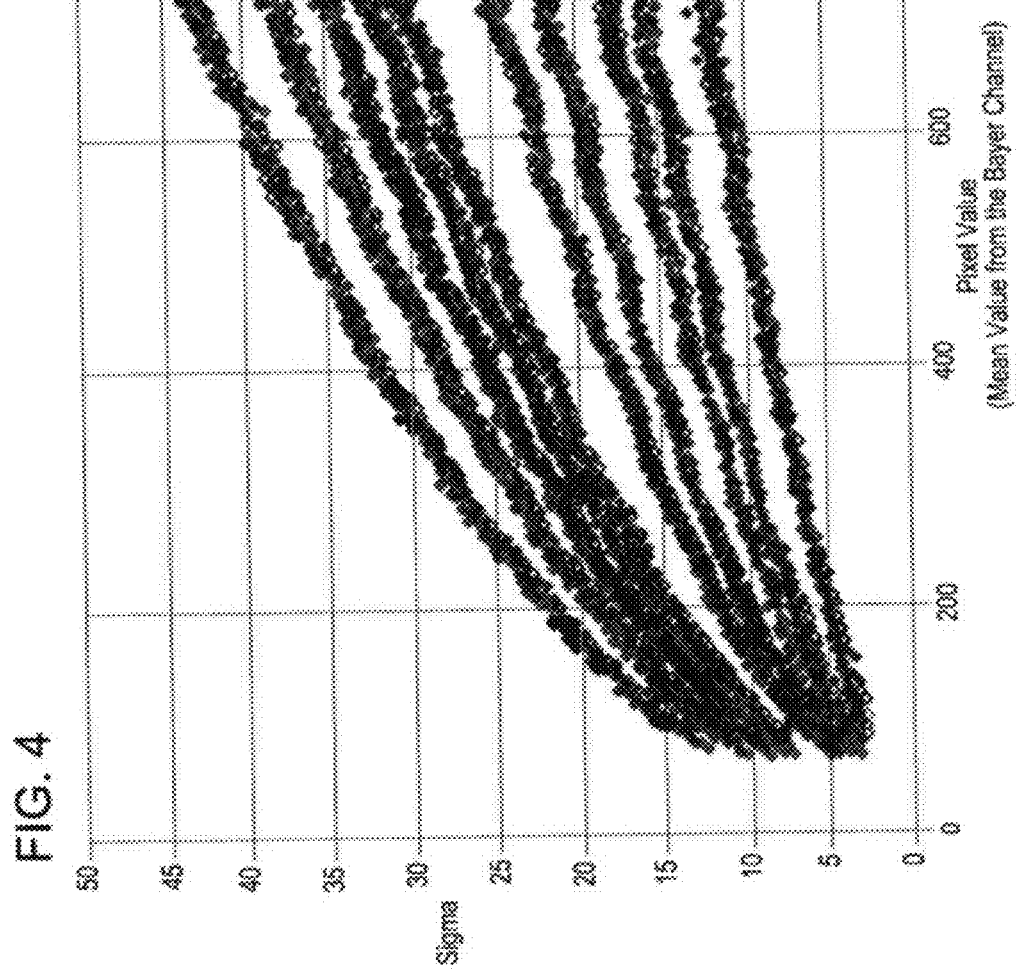
FIG. 4 illustrates exemplary noise curves wherein the abcissa shows pixel values in the form of mean values from the respective Bayer channels and the ordinate shows noise levels (sigma values). Curves are shown for different analog gains of the sensors used to obtain a digital image.

Exemplary noise level (sigma) curves for obtaining the noise level used by the flatness evaluator are shown in FIG. 4, wherein the abscissa shows pixel values in the form of mean values from the respective Bayer channels and the ordinate shows noise level values. Obtaining noise curves for all involved pixel intensities at all involved gains is conventional. Curves are shown for different analog gains of the sensor used to obtain a digital image. The lowest curve is at analog gain 1, and the highest curve is at analog gain "maximum". According to signal dependent noise theory, the standard deviation of noise increases with signal intensity (pixel value) and analog gain. As can be seen from FIG. 4, the value of the denominator of sigmaRatio increases with increasing pixel values (pixel intensities). Higher analog gains yield higher values of the denominator of sigmaRatio. Since the denominator depends on the analog gain, larger oscillations of the numerator of sigmaRatio characteristic for noisy conditions are compensated by the associated higher values in the denominator due to higher analog gains.

Figure 5:
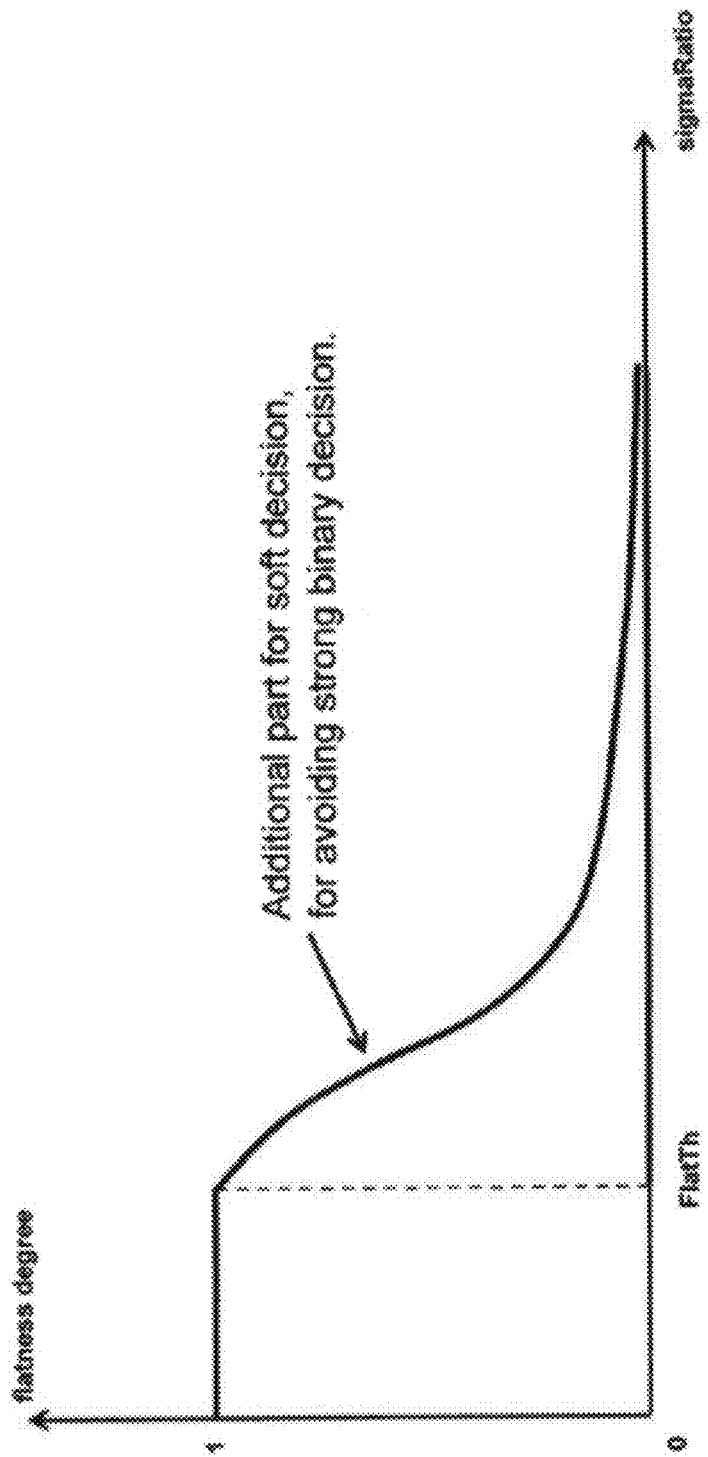
FIG. 5 illustrates the flatness degree as a function of sigmaRatio according to a soft decision implementation according to an example.

As already mentioned, for flat regions sigmaRatio is close to 1, and with increasing texture, the ratio sigmaRatio becomes increasingly greater than 1. The final flatness/texture degree of a sub-mask, i.e., of the central pixel of the same, is determined by the sum of the flatness/texture measure contributions of each sub-mask. In order to classify the central pixel as a flat or textured one, the actual ratio sigmaRatio for each considered pixel (the respective central pixels of the moving 9×9 kernel) is compared with some threshold Flatth. Based on the classification of the central pixel, one can classify an area (i.e., determine the texture of an area) in which the kernel is positioned. In the classification process, a soft thresholding operation can be employed in order to avoid a hard binary decision as it is illustrated in FIG. 5. This figure illustrates the flatness degree as a function of sigmaRatio. A central pixel of a sub-mask is classified as flat, if sigmaRatio is close to 1. The decision whether or not the condition "close to" is observed can be adjusted by a soft thresholding such that the central pixel of the sub-mask can be classified as somewhat flat even for a sigmaRatio above some particular threshold value, i.e., it is assigned a flatness degree that decreases with increasing distance of sigmaRatio from the threshold Flatth as it is shown in FIG. 5.

In addition, as already mentioned above, selection of the texture threshold used for classifying flat and textured regions should take into account an underestimation of the numerator in sigmaRatio due to a finite-sized kernel. Experiments with 3×3, 5×5 and 9×9 kernels for processing a flat Macbeth patch show that by increasing the kernel size, the peak of histograms of sigmaRatio shifts toward 1, implying that oscillations in larger kernels better approximate the real full range of oscillations present in a selected region of a digital image than smaller kernels. This effect might be taken into account when selecting the threshold Flatth of FIG. 5. Moreover, the standard deviation of pixel values in the interpolated sub-masks tends to be lower than in a sub-mask representing real Bayer samples. This effect also may be taken into account when selecting the threshold Flatth of FIG. 5. In fact, taking into account both effects calls for adjusting the threshold shown in FIG. 5 by some left-shift of the same, thereby also shifting the domain of smooth decision to lower values of sigmaRatio.

Furthermore, a linear interpolation might be implemented for the soft decision process shown in FIG. 5, particularly, after adjustment of the threshold as explained above, in order to speed up the computational process. A smooth transition between 100% flatness and 0% flatness can be realized by a linear decay between a first and a second threshold as it is illustrated in FIG. 6. The thresholds LS and HS shown in FIG. 6 are selected such that if sigmaRatio is greater than the second threshold 0% flatness (maximum texture) is assigned to the central pixel of the kernel under consideration, and if sigmaRatio is between the first and the second thresholds LS and HS, a flatness degree corresponding to a linear function between 100% flatness at sigmaRatio=LS, and 0% flatness (maximum texture) at sigmaRatio=HS is assigned to the central pixel. Thus, in this example, the flatness degree is calculated according to $$flatnessdegree = \frac{LS - sigmaRatio}{HS - LS} + 1.$$

By such a linear function, hard binary decisions between flat and textured are avoided in a time-efficient manner. For each submask, different thresholds LS and HS might be chosen. For a test image sensor having 10 bits per pixel bit depth, the layer1 to layer4 described with reference to FIG. 2 above might be chosen as, for example:

layer1: LS=0.8; HS=1.0, layer2: LS=0.6; HS=0.8, layer3: LS=0.6; HS=0.8, layer4: LS=0.3; HS=0.5.

The threshold chosen for layer2 and layer3 have the same values because they refer to a mask size of 3×3 in which interpolation is performed using the same number of pixels (i.e. each interpolated value comes from the division of two pixel values). On the other hand, the thresholds for layer4 are significantly lower because the interpolation comes from 4 pixel values.

The flatness degree of the kernel may be calculated from the flatness degrees of the layers; for example, the flatness degree of the kernel may be calculated as the average of the flatness degrees of the layers. But other embodiments for calculating the flatness degree of the kernel are possible. Each flatness degree is a number between 0 and 1. When one sums the contribution of the four layers, he/she finally obtains a number between 0 and 4, such that 0 corresponds to maximum texture and 4 corresponds to maximum flatness. But if one were to use another law, such as the average law mentioned here, he/she could change the sensitivity of the technique.

In principle, the thresholds may vary depending on the kernel size, the interpolation process, and the image sensor used.

The above-described examples for the detection of texture can be used in image processing for noise reduction. Based on some texture degree representative of the texture of a local region of a digital image, noise filter smoothing capability can be adjusted such that flat regions are strongly smoothed whereas in highly textured regions, filtering/smoothing is only performed for small differences in pixel values of neighbored pixels.

All previously discussed, embodiments are not intended as limitations, but serve as examples illustrating features and advantages of the disclosed ideas. It is to be understood that some or all of the above described features can also be combined in different ways.

Furthermore, imaging systems that may employ one or more of the above-described embodiments, or one or more related embodiments, include digital cameras, cell phones, and digital video recorders.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method for the detection of texture of a digital image, comprising:
receiving image data of the image from Bayer image sensors;
determining a noise level in the image data;
determining a texture value representing a degree of texture based on the determined noise without using a high pass filter or a low pass filter;
providing a first sub-mask centered on a center pixel, wherein the first sub-mask comprises Bayer samples;
interpolating over the pixel locations of the Bayer samples to obtain three interpolated sub-masks; and
determining the texture from a texture measure for each of the first sub-mask and the three interpolated sub-masks.

2. The method according to claim 1, wherein determining the texture from a texture measure for each of the first sub-mask and the three interpolated masks comprises:
determining a standard deviation of the pixel values of the pixels comprised in the sub-mask;
determining a minimum pixel value of the pixels surrounding the central pixel comprised in the sub-mask; and
determining a noise level associated with the minimum pixel value.

3. The method according to claim 2, further comprising determining the texture measure of the central pixel from a ratio of the standard deviation of the pixel values and the noise level associated with the minimum pixel value.

4. The method according to claim 3, wherein a total texture measure of the central pixel is determined from a sum of the texture measures determined for the first sub-mask and the three interpolated sub-masks.

5. The method according to claim 4, further comprising assigning a texture degree to the central pixel based on the total texture measure and classifying a region of the image as either a textured region or a flat region based on the texture degree.

6. The method according to claim 5, further comprising determining a texture threshold for classifying the central pixel as either being textured or flat, wherein the texture threshold is determined based on ratios of the standard deviation of the pixel values and the noise level associated with the minimum pixel value of the pixels surrounding the central pixel obtained for the sub-masks for flat patches of a Macbeth chart.

7. The method according to claim 6, further comprising correcting the texture threshold for compensation of an underestimating of the texture due to incomplete coverage of oscillations of pixel values resulting from a finite-size of the sub-masks.

8. The method according to claim 6, further comprising correcting the texture threshold for compensation of an underestimating of the texture due to the interpolation process by which the three interpolated sub-masks are obtained.

9. The method according to claims 5, wherein the texture degree is assigned based on a linear transition between a 100% degree texture and a 0% degree texture.

10. The method according to claim 2, wherein each of the first and the three interpolated sub-masks has a size of 3×3 pixels.

11. An image processor, comprising:
a region unit configured to determine pixel values respectively representing pixels forming a region of an image of an object;
a noise unit configured to determine a noise value representing noise in the region of the image;
an evaluator configured to determine a conformity value representing conformity of the pixel values, and to determine, in response to the noise and conformity values, a texture value representing a degree of texture of a region of the object corresponding to the region of the image;
wherein the evaluation unit is configured:
to determine a quotient equal to the conformity value divided by the noise value; and
to determine the texture value in response to the quotient.

12. The image processor of claim wherein the region unit is configured:
to receive signals from pixel-array elements corresponding to at least some of the pixels; and
to determine each of the pixel values representing the at least some of the pixels in response to a respective one of the received signals.

13. The image processor of claim 11 wherein the region unit is configured:
to receive signals from pixel-array elements corresponding to pixels that are near at least some of the pixels; and
to determine the pixel values representing the at least some of the pixels by interpolating each of the at least some pixel values in response to respective groups of the received signals.

14. The image processor of claim 11 wherein the noise value includes a noise standard deviation.

15. The image processor of claim 11 wherein the noise unit is configured to determine the noise value in response to a gain of pixel array elements corresponding to the pixels.

16. The image processor of claim 11 wherein:
the pixels include an inner pixel and outer pixels; and
the noise unit is configured to determine the noise value in response to the minimum of the values of the outer pixels.

17. The image processor of claim 11 wherein the conformity value includes a standard deviation of the pixel values.

18. The image processor of claim 11 wherein the evaluation unit is further configured to determine the texture value in response to at least one texture threshold.

19. The image processor of claim 11 wherein:
the region unit is configured to determine groups of pixel values, the pixel values of each group respectively representing the pixels forming the region of the image of the object;
the noise unit is configured to determine a respective noise value for each group of pixel values; and
the evaluator unit is configured
to determine a respective conformity value for each group of pixel values,
to determine a respective partial texture value for each group of pixel values in response to the noise and conformity values for the group of pixel values, and
to determine the texture value representing the texture of the region of the object in response to the partial texture values.

20. The image processor of claim 11, further including a filter unit configured to filter noise from the region of the image in response to the texture value.

21. The image processor of claim 11, further including a filter unit configured
to filter noise from the region of the image in response to filter function coefficients; and
to set the coefficients in response to the texture value.

22. The image processor of claim 11 wherein:
the region of the image includes a 9×9-pixel region; and
wherein the pixel values represent 9 of the pixels forming the 9×9 region.

23. The image processor of claim 11 wherein:
the region of the image includes a 7×7 pixel region; and
wherein the pixel values represent 9 of the pixels forming the 7×7 region.

24. The image processor of claim 11 wherein:
the region of the image includes a center pixel having a type; and
wherein the pixel values represent pixels that form a grid within the region, the grid including the center pixel and surrounding pixels having the type.

25. A method, comprising:
determining at least one noise value representing noise of at east one group of pixel values of pixels forming a region of an image;
determining at least one conformity value representing conformity of the at least one group of pixel values;
determining, in response to the noise and conformity values, a flatness value representing a degree of flatness of the region of the image;
providing a first sub-mask centered on a center pixel, wherein the first sub-mask comprises Bayer samples;
interpolating over the pixel locations of the Bayer samples to obtain three interpolated sub-masks; and
determining the flatness from a flatness measure for each of the first sub-mask and the three interpolated sub-masks.

26. The method of claim 25, further including receiving at least some of the pixel values.

27. The method of claim 25, further including receiving at least some of the pixel values from pixel elements exposed through a color filter array.

28. The method of claim 25, further including interpolating at least some of the pixel values of the pixels forming the region from the pixel values of other pixels forming the region.

29. The method of claim 25, further including:
generating the pixel values in response to a signal gain; and
wherein determining the at least one noise value includes determining the at least one noise value in response to the gain.

30. The method of claim 25 wherein:
determining at least one noise value includes determining a respective noise value for each of multiple groups of pixel values of the pixels;
determining at least one conformity value includes determining a respective conformity value for each of the multiple groups of pixel values;
determining for each group of pixel values, in response to the respective noise and conformity values for the group, a respective partial flatness value; and
determining the flatness value in response to the partial flatness values.

31. An image device, comprising:
an array of pixel elements configured to capture an image of an object; and an image processor coupled to the array and including:
a region unit configured to determine pixel values respectively representing pixels forming a region of the image;
a noise unit configured to determine a noise value representing noise in the region of the image; and
an evaluator unit configured to determine a conformity value representing conformity of the pixel values;
to determine, in response to the noise and conformity values, a texture value representing a degree of texture of a region of the object corresponding to the region of the image; to determine a quotient equal to the conformity value divided by the noise value; and to determine the texture value in response to the quotient.

32. The image device of claim 31 wherein the evaluation unit is further configured to determine the texture value in response to at least one texture threshold.

33. The image device of claim 31 further including a lens assembly configured to direct light emanating from the object onto the array.

34. A system, comprising:
an image device, including:
an array of pixel elements configured to capture an image of an object; and an image processor coupled to the array and including:
a region unit configured to determine pixel values respectively representing pixels forming a region of the images;
a noise unit configured to determine a noise value representing noise in the region of the image; and
an evaluator unit configured to determine a conformity value representing conformity of the pixel values; to determine, in response to the noise and conformity values, a texture value representing a degree of texture of a region of the object corresponding to the region of the image; to determine a quotient equal to the conformity value divided by the noise value; and to determine the texture value in response to the quotient.

35. The system of claim 34, further including:
wherein the image processor further includes a filter unit configured to filter noise from the region of the image in response to the texture value; and
a transmitter configured to transmit the image after it is processed by the image processor.

36. The system of claim 34 wherein the evaluation unit is further configured to determine the texture value in response to the quotient and to at least one texture threshold.

* * * * *

UNITED STATES PATENT AND TRADEMARK OFFICE
CERTIFICATE OF CORRECTION

| | | |
|---|---|---|
| PATENT NO. | : 9,153,036 B2 | Page 1 of 1 |
| APPLICATION NO. | : 13/359333 | |
| DATED | : October 6, 2015 | |
| INVENTOR(S) | : Angelo Bosco et al. | |

It is certified that error appears in the above-identified patent and that said Letters Patent is hereby corrected as shown below:

In the claims

Column 11, Line 35:
"an evaluator configured to determine a conformity value" should read, --an evaluator unit configured to determine a conformity value--.

Column 11, Line 45:
"12. The image processor of claim wherein the region unit is" should read, --12. The image processor of claim 11 wherein the region unit is--.

Column 12, Line 49:
"at east one group of pixel values of pixels forming a" should read, --at least one group of pixel values of pixels forming a--.

Column 14, Lines 34-35:
"further configured to determine the texture value in response to the quotient and to at least one texture threshold." should read, --further configured to determine the texture value in response to at least one texture threshold.--.

Signed and Sealed this
Fifth Day of April, 2016

Michelle K. Lee
*Director of the United States Patent and Trademark Office*